United States Patent
Kono et al.

(10) Patent No.: US 12,009,759 B2
(45) Date of Patent: Jun. 11, 2024

(54) POWER CONVERSION SYSTEM

(71) Applicant: Mitsubishi Electric Corporation, Tokyo (JP)

(72) Inventors: Yoshiyuki Kono, Tokyo (JP); Shuhei Fujiwara, Tokyo (JP); Ryosuke Uda, Tokyo (JP); Takuya Kajiyama, Tokyo (JP); Toshiyuki Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 66 days.

(21) Appl. No.: 17/919,703

(22) PCT Filed: Jun. 17, 2020

(86) PCT No.: PCT/JP2020/023813
§ 371 (c)(1),
(2) Date: Oct. 18, 2022

(87) PCT Pub. No.: WO2021/255868
PCT Pub. Date: Dec. 23, 2021

(65) Prior Publication Data
US 2023/0147142 A1 May 11, 2023

(51) Int. Cl.
*H02M 7/12* (2006.01)
*H02J 3/00* (2006.01)
(Continued)

(52) U.S. Cl.
CPC .............. *H02M 7/12* (2013.01); *H02J 3/001* (2020.01); *H02M 1/0067* (2021.05); *H02M 1/32* (2013.01); *H02M 1/4208* (2013.01)

(58) Field of Classification Search
CPC ........ H02M 7/12; H02M 1/0067; H02M 1/32; H02M 1/4208; H02M 1/325; H02M 7/539;
(Continued)

(56) References Cited

U.S. PATENT DOCUMENTS 5,319,536 A * 6/1994 Malik .................... H02J 1/108
307/82

FOREIGN PATENT DOCUMENTS

EP          3745582 A1    12/2020
JP      2012228025 A     11/2012
(Continued)

OTHER PUBLICATIONS

International Search Report (PCT/ISA/210) with translation and Written Opinion (PCT/ISA/237) mailed on Sep. 1, 2020, by the Japan Patent Office as the International Searching Authority for International Application No. PCT/JP2020/023813. (8 pages).

*Primary Examiner* — Jung Kim
(74) *Attorney, Agent, or Firm* — BUCHANAN INGERSOLL & ROONEY PC

(57) ABSTRACT

A power conversion system includes: a first power converter to perform power conversion between a first AC system and a DC circuit; and a second power converter to perform power conversion between a second AC system and the DC circuit. Each of the first power converter and the second power converter includes a plurality of submodules connected in series. Each of the plurality of submodules includes a plurality of switching elements and a capacitor. A first fundamental frequency of the first AC system is greater than a second fundamental frequency of the second AC system. A first average voltage value of a capacitor in a first submodule included in the first power converter is larger than a second average voltage value of a capacitor in a second submodule included in the second power converter.

10 Claims, 7 Drawing Sheets

(51) Int. Cl.
*H02M 1/00* (2006.01)
*H02M 1/32* (2007.01)
*H02M 1/42* (2007.01)

(58) Field of Classification Search
CPC .......... H02M 7/4835; H02J 3/001; H02J 3/36; H02J 3/34
See application file for complete search history.

(56) References Cited

FOREIGN PATENT DOCUMENTS

| | | | |
|---|---|---|---|
| JP | 6425855 | B1 | 11/2018 |
| JP | 2019047701 | A | 3/2019 |

\* cited by examiner

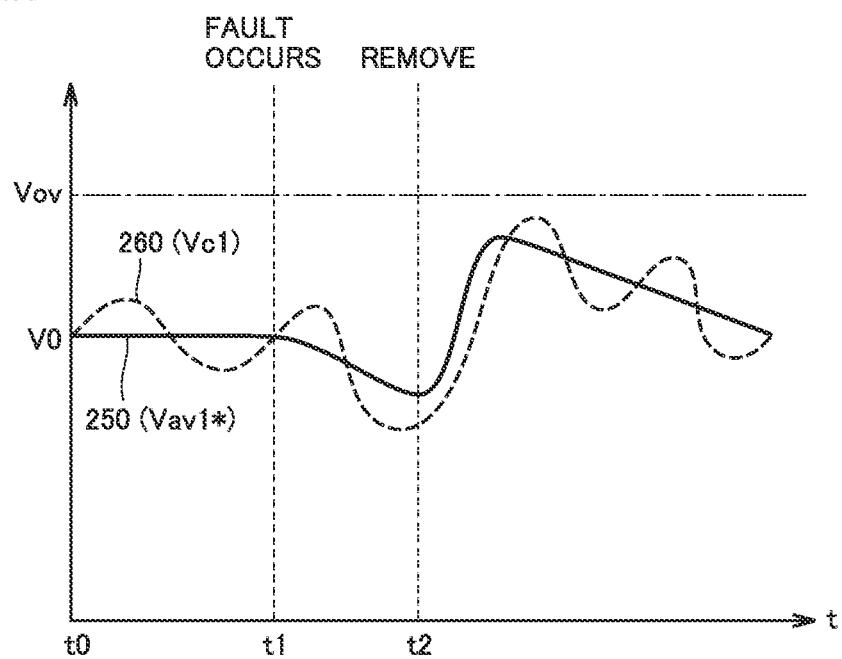

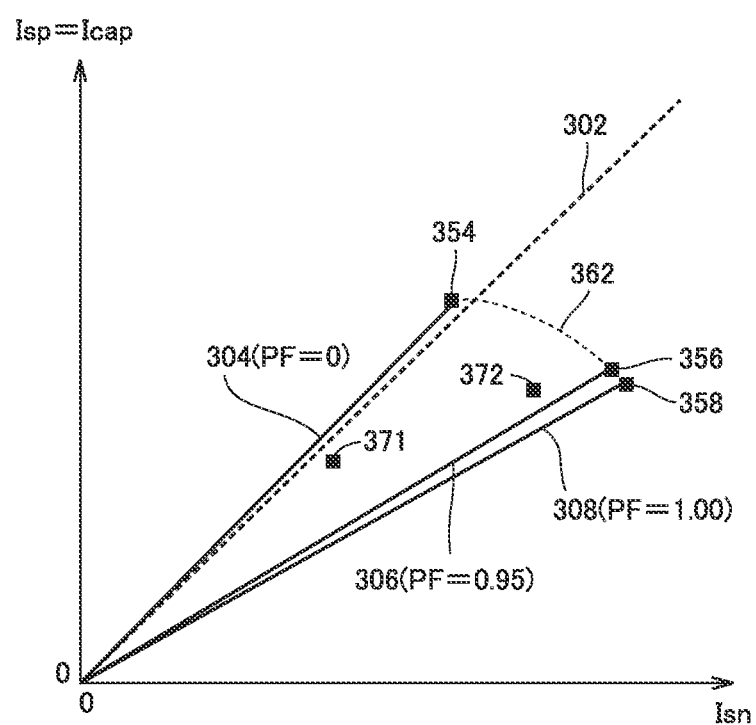

POWER CONVERSION SYSTEM

TECHNICAL FIELD

The present disclosure relates to a power conversion system.

BACKGROUND ART

A modular multilevel converter (hereinafter, also referred to as "MMC converter") in which a plurality of unit converters are cascaded can easily deal with a higher voltage by increasing the number of unit converters. "Unit converter" is also referred to as "submodule" or "converter cell". The MMC converter is widely applied to a power transmission and distribution system as a large-capacity static VAR compensator or a power conversion device for high-voltage DC power transmission.

In Japanese Patent Laying-Open No. 2012-228025 (PTL 1), suppressing fluctuations in DC capacitor voltage caused by a cycle of a fundamental frequency of a power-supply-side or load-side voltage is under study.

CITATION LIST

Patent Literature

PTL 1: Japanese Patent Laying-Open No. 2012-228025

SUMMARY OF INVENTION

Technical Problem

A power conversion system including MMC-type power converters is used, for example, as a system for controlling electric power of a DC power transmission system. Typically, electric power is exchanged between two AC systems through a DC circuit, and these AC systems may be different in system conditions (e.g., a fundamental frequency and a power request). In this case, a power converter connected to one AC system and a power converter connected to the other AC system are different in required specifications. However, from the perspective of maintainability, it is preferable to use a submodule composed of the same components (e.g., a DC capacitor) in each power converter.

For example, when these AC systems have different fundamental frequencies, voltage fluctuations of a first DC capacitor on the AC system side having a lower fundamental frequency are greater than voltage fluctuations of a second DC capacitor on the AC system side having a higher fundamental frequency. Therefore, a capacitance required to suppress the voltage fluctuations of the second DC capacitor is smaller than a capacitance required to suppress the voltage fluctuations of the first DC capacitor. Thus, when the same DC capacitor is used, it is necessary to adopt the capacitance required to suppress the voltage fluctuations of the first DC capacitor. In this case, the voltage fluctuations of the second DC capacitor are suppressed more greatly than the required specifications, and thus, a difference (i.e., margin) between a maximum voltage and a withstand voltage becomes large, which causes waste. PTL 1 neither teaches nor suggests a solution to such a problem.

An object in an aspect of the present disclosure is to provide a power conversion system capable of reducing a size of the entire system while ensuring maintainability of a plurality of power converters connected to a plurality of AC systems having different system conditions, respectively.

Solution to Problem

A power conversion system according to an embodiment includes: a first power converter to perform power conversion between a first AC system and a DC circuit; and a second power converter to perform power conversion between a second AC system and the DC circuit. Each of the first power converter and the second power converter includes a plurality of submodules connected in series. Each of the plurality of submodules includes a plurality of switching elements and a capacitor. A first fundamental frequency of the first AC system is greater than a second fundamental frequency of the second AC system. A first average voltage value of a capacitor in a first submodule included in the first power converter is larger than a second average voltage value of a capacitor in a second submodule included in the second power converter.

A power conversion system according to another embodiment includes: a first power converter to perform power conversion between a first AC system and a DC circuit; and a second power converter to perform power conversion between a second AC system and the DC circuit. Each of the first power converter and the second power converter includes a plurality of submodules connected in series. Each of the plurality of submodules includes a plurality of switching elements and a capacitor. A current effective value of a capacitor in a first submodule included in the first power converter based on a power factor and an apparent power requested from the first AC system is smaller than a current effective value of a capacitor in a second submodule included in the second power converter based on a power factor and an apparent power requested from the second AC system. A first average voltage value of the capacitor in the first submodule is larger than a second average voltage value of the capacitor in the second submodule.

Advantageous Effects of Invention

According to the present disclosure, the power conversion system is capable of reducing a size of the entire system while ensuring maintainability of a plurality of power converters connected to a plurality of AC systems having different system conditions, respectively.

BRIEF DESCRIPTION OF DRAWINGS

FIG. 6 shows a change in capacitor voltage before and after a fault occurs in an AC system.

FIG. 7 is a diagram for illustrating a relationship between a current flowing to the positive electrode side and a current flowing to the negative electrode side in the submodule.

DESCRIPTION OF EMBODIMENTS

Embodiments will be described hereinafter with reference to the drawings. In the following description, the same

First Embodiment

<Overall Configuration of System>

Figure 1:
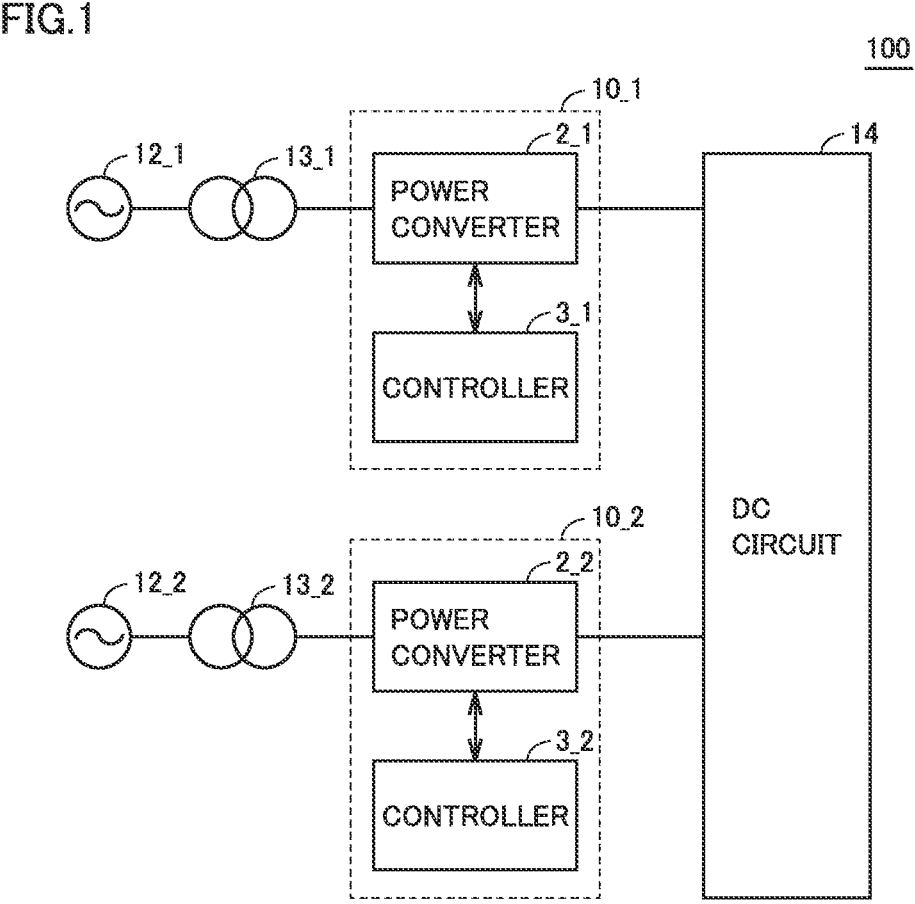
FIG. 1 is a schematic configuration diagram of a power conversion system according to the present embodiment.

FIG. 1 is a schematic configuration diagram of a power conversion system 100 according to a first embodiment. Referring to FIG. 1, power conversion system 100 includes power conversion devices 10_1 and 10_2 (hereinafter, also collectively referred to as "power conversion device 10"), AC systems 12_1 and 12_2 (hereinafter, also collectively referred to as "AC system 12"), transformers 13_1 and 13_2 (hereinafter, also collectively referred to as "transformer 13"), and a DC circuit 14. A configuration in which two systems each including AC system 12, transformer 13 and power conversion device 10 are connected to common DC circuit 14 will be described below. However, three or more systems may be connected to DC circuit 14.

In power conversion system 100, electric power is received and transmitted between AC system 12_1 and AC system 12_2 through DC circuit 14. AC system 12_1 and AC system 12_2 are three-phase AC systems having different system conditions. Specifically, a fundamental frequency F1 of AC system 12_1 is higher than a fundamental frequency F2 of AC system 12_2, and fundamental frequencies F1 and F2 are, for example, 60 Hz and 50 Hz, respectively. DC circuit 14 is a DC line or a DC bus.

Power conversion device 10_1 includes a power converter 2_1 to perform power conversion between AC system 12_1 and DC circuit 14, and a controller 3_1. Power conversion device 10_2 includes a power converter 2_2 to perform power conversion between AC system 12_2 and DC circuit 14, and a controller 3_2. Each of power converters 2_1 and 2_2 is implemented by a power converter of MMC conversion type. Controller 3_1 controls the operation of power converter 2_1. Controller 3_2 controls the operation of power converter 2_2. In the following description, power converters 2_1 and 2_2 will be also collectively referred to as "power converter 2" and controllers 3_1 and 3_2 will be also collectively referred to as "controller 3".

Transformer 13_1 is connected between AC system 12_1 and power converter 2_1. Transformer 13_2 is connected between AC system 12_2 and power converter 2_2.

When electric power is transmitted from AC system 12_1 to AC system 12_2, power converter 2_1 operates as a rectifier (REC) and power converter 2_2 operates as an inverter (INV). Specifically, AC power is converted into DC power by power converter 2_1, and the converted DC power is DC-transmitted through DC circuit 14. The DC power is converted into AC power by power converter 2_2 at a power reception end, and the converted AC power is supplied to AC system 12_2 through transformer 13_2. When power converter 2_1 operates as an inverter and power converter 2_2 operates as a rectifier, the conversion operation opposite to the above-described conversion operation is performed.

<Configuration of Power Conversion Device>

Figure 2:
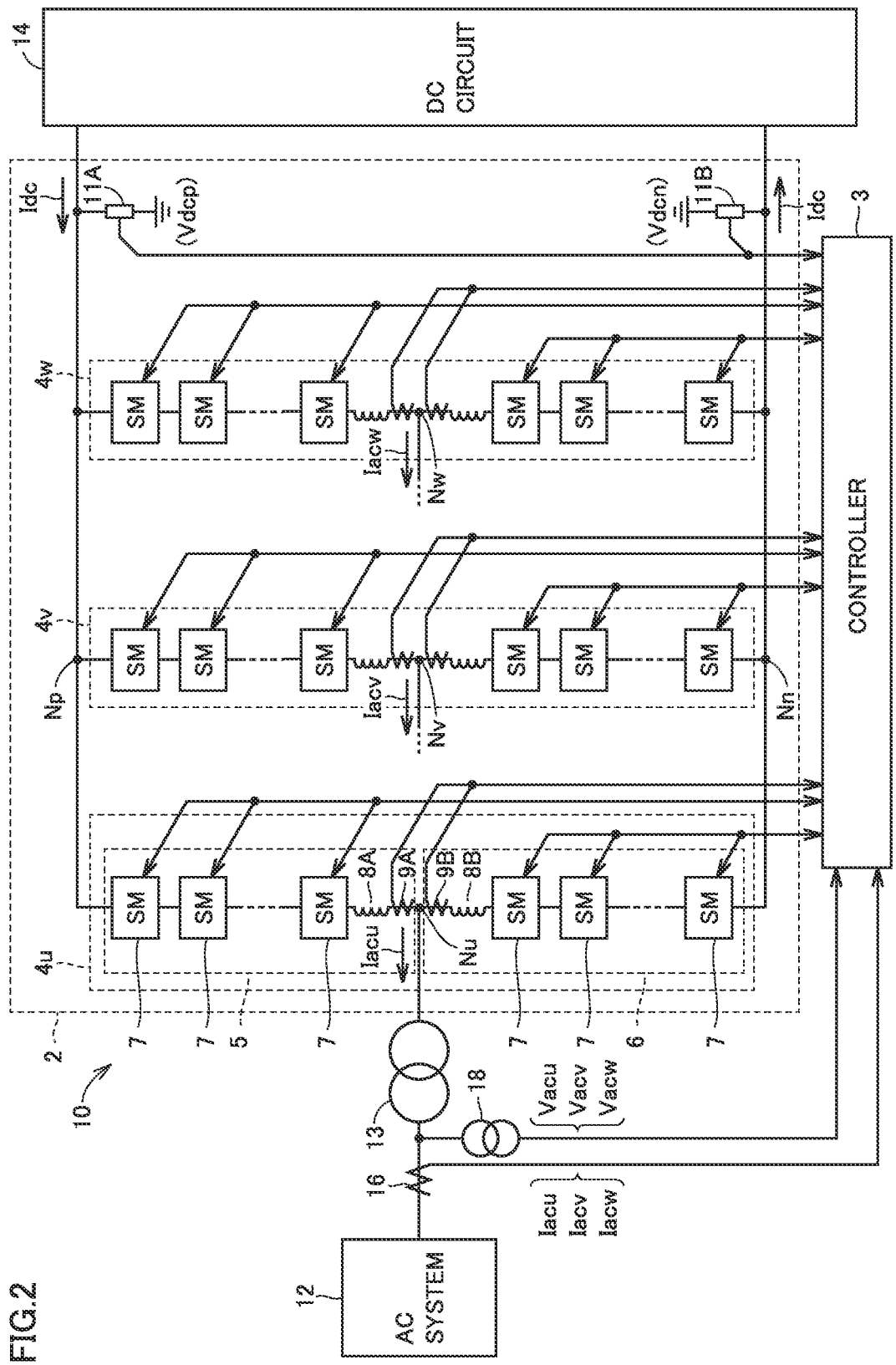
FIG. 2 is a schematic configuration diagram of a power converter.

FIG. 2 is a schematic configuration diagram of power converter 2. Referring to FIG. 2, power converter 2 is implemented by an MMC converter including a plurality of submodules (corresponding to "SM" in FIG. 2) 7 connected in series to each other.

Power converter 2 includes a plurality of leg circuits 4u, 4v and 4w (hereinafter, denoted as "leg circuit 4" when leg circuits 4u, 4v and 4w are collectively mentioned or when any one of leg circuits 4u, 4v and 4w is mentioned) connected in parallel with each other between a positive electrode DC terminal (i.e., higher-potential-side DC terminal) Np and a negative electrode DC terminal (i.e., lower-potential-side DC terminal) Nn.

Leg circuit 4 is provided for each of a plurality of phases that form an alternating current. Leg circuit 4 is connected between AC system 12 and DC circuit 14, to perform power conversion therebetween. In power converter 2, three leg circuits 4u, 4v and 4w are provided to correspond to a U phase, a V phase and a W phase, respectively.

AC input terminals Nu, Nv and Nw provided in leg circuits 4u, 4v and 4w, respectively, are connected to AC system 12 through transformer 13. For ease of illustration, FIG. 2 does not show the connection between AC input terminals Nv and Nw and transformer 13. Positive electrode DC terminal Np and negative electrode DC terminal Nn commonly connected to each leg circuit 4 are connected to DC circuit 14.

Leg circuit 4u includes an upper arm 5 from positive electrode DC terminal Np to AC input terminal Nu, and a lower arm 6 from negative electrode DC terminal Nn to AC input terminal Nu. AC input terminal Nu, which is a connection point of upper arm 5 and lower arm 6, is connected to transformer 13. Since leg circuits 4v and 4w are configured similarly, leg circuit 4u will be representatively described below.

Upper arm 5 includes a plurality of submodules 7 that are cascaded, and a reactor 8A. The plurality of submodules 7 and reactor 8A are connected in series to each other. Lower arm 6 includes a plurality of submodules 7 that are cascaded, and a reactor 8B. The plurality of submodules 7 and reactor 8B are connected in series to each other. Instead of the reactor, each of upper arm 5 and lower arm 6 may be connected to AC system 12 through a three-winding transformer having an impedance equivalent to that of the reactor.

Power conversion system 100 is provided with detectors that measure an amount of electricity (e.g., a current, a voltage and the like) used for control. Examples of the detectors include an AC voltage detector 18, an AC current detector 16, DC voltage detectors 11A and 11B, arm current detectors 9A and 9B provided in each leg circuit 4, and the like. Signals detected by these detectors are input to controller 3.

Based on these detected signals, controller 3 outputs operation commands for controlling operation states of submodules 7 in power converter 2. The operation commands are generated to correspond to the arms (e.g., the U-phase upper arm, the U-phase lower arm, the V-phase upper arm, the V-phase lower arm, the W-phase upper arm, and the W-phase lower arm). In addition, controller 3 receives various types of information from each submodule 7. The various types of information are internal information of submodule 7, and include a voltage value of a capacitor in submodule 7, state information indicating a state of submodule 7, and the like. The state information includes information indicating whether submodule 7 is in a normal operation state in which submodule 7 is operating normally, or in a stop state, information indicating the presence or absence of a failure of submodule 7, and the like.

Controller 3 typically includes, as hardware configurations, an auxiliary transformer, an Analog to Digital (AD) conversion unit, a processor and the like. The processor includes a central processing unit (CPU), a random access memory (RAM) and a read only memory (ROM). The AD conversion unit includes an analog filter, a sample hold circuit, a multiplexer and the like. Controller 3 may be implemented by, for example, a digitally-protected controller.

For ease of illustration, FIG. 2 collectively shows a part of the signal lines for the signals input from the detectors to controller 3 and the signal lines for the signals input and output between controller 3 and submodules 7. Actually, however, the signal lines are provided for each detector and for each submodule 7. The signal lines for transmission and the signal lines for reception may be separately provided between submodules 7 and controller 3. Each signal line is implemented by, for example, an optical fiber.

AC voltage detector 18 detects a U-phase AC voltage Vacu, a V-phase AC voltage Vacv, and a W-phase AC voltage Vacw of AC system 12. AC current detector 16 detects a U-phase AC current Iacu, a V-phase AC current Iacy, and a W-phase AC current Iacw of AC system 12. DC voltage detector 11A detects a DC voltage Vdcp of positive electrode DC terminal Np connected to DC circuit 14. DC voltage detector 11B detects a DC voltage Vdcn of negative electrode DC terminal Nn connected to DC circuit 14. A difference between DC voltage Vdcp and DC voltage Vdcn is referred to as "DC voltage Vdc".

Arm current detectors 9A and 9B provided in leg circuit 4u for the U phase detect an arm current Ipu flowing through upper arm 5 and an arm current Inu flowing through lower arm 6, respectively. Similarly, arm current detectors 9A and 9B provided in leg circuit 4v for the V phase detect an arm current Ipv and an arm current Inv, respectively. Arm current detectors 9A and 9B provided in leg circuit 4w for the W phase detect an arm current Ipw and an arm current Inw, respectively. In the following description, arm currents Ipu, Inu, Ipv, Inv, Ipw, and Inw are collectively referred to as "arm current Iarm".

<Configuration of Submodule>

Figure 3:
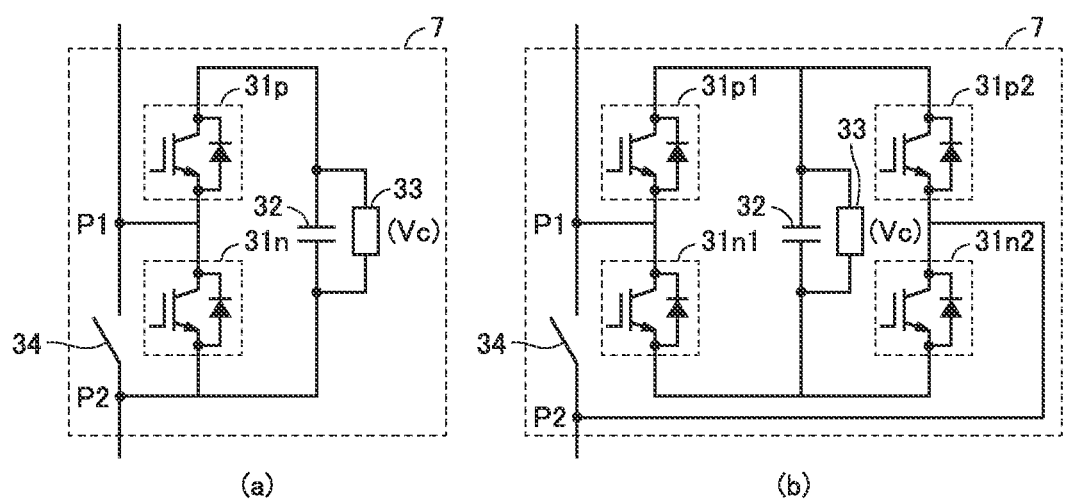
FIG. 3 is a circuit diagram showing an example of a submodule.

FIG. 3 is a circuit diagram showing an example of the submodule. Submodule 7 shown in FIG. 3(a) has a circuit configuration called "half bridge configuration". This submodule 7 includes a series body formed by connecting two switching elements 31p and 31n in series, a capacitor 32 serving as an energy accumulator, a voltage detector 33, and a bypass switch 34. The series body and capacitor 32 are connected in parallel. Voltage detector 33 detects a capacitor voltage Vc, which is a voltage across capacitor 32.

Submodule 7 shown in FIG. 3(b) has a circuit configuration called "full bridge configuration". This submodule 7 includes a first series body formed by connecting two switching elements 31p1 and 31n1 in series, a second series body formed by connecting two switching elements 31p2 and 31n2 in series, and capacitor 32, and voltage detector 33. The first series body, the second series body and capacitor 32 are connected in parallel. Voltage detector 33 detects capacitor voltage Vc.

Each of two switching elements 31p and 31n in FIG. 3(a) and four switching elements 31p1, 31n1, 31p2, and 31n2 in FIG. 3(b) is, for example, formed by connecting a freewheeling diode (FWD) in antiparallel with a semiconductor switching element of self arc-extinguishing type, such as an insulated gate bipolar transistor (IGBT), a gate commutated turn-off (GCT) thyristor and a metal oxide semiconductor field-effect transistor (MOSFET). In addition, in FIGS. 3(a) and 3(b), a capacitor such as a film capacitor is mainly used as capacitor 32.

In the following description, switching elements 31p, 31n, 31p1, 31n1, 31p2, and 31n2 will be also collectively referred to as "switching element 31". In addition, on and off of the semiconductor switching element in switching element 31 will be simply denoted as "on and off of switching element 31".

Referring to FIG. 3(a), opposing terminals of switching element 31n are referred to as "input/output terminals P1 and P2". By the switching operation of switching elements 31p and 31n, the voltage across capacitor 32 and a zero voltage are output. For example, when switching element 31p is turned on and switching element 31n is turned off, the voltage across capacitor 32 is output. When switching element 31p is turned off and switching element 31n is turned on, the zero voltage is output. Although the opposing terminals of switching element 31n are referred to as "input/output terminals P1 and P2" in FIG. 3(a), opposing terminals of switching element 31p may be referred to as "input/output terminals P1 and P2", and in this case, the operation is reversed.

Bypass switch 34 is connected between input/output terminals P1 and P2. In FIG. 3(a), bypass switch 34 is connected in parallel with switching element 31n. However, when the opposing terminals of switching element 31p are referred to as "input/output terminals P1 and P2", bypass switch 34 is connected in parallel with switching element 31p. By turning on bypass switch 34, submodule 7 is short-circuited. Bypass switch 34 is also used to short-circuit submodule 7 when each element in this submodule 7 fails. Thus, even when any one of the plurality of submodules 7 fails, power converter 2 can continue to operate by using another submodule 7.

Next, referring to FIG. 3(b), a midpoint between switching element 31p1 and switching element 31n1 and a midpoint between switching element 31p2 and switching element 31n2 are referred to as "input/output terminals P1 and P2" of submodule 7. By keeping switching element 31n2 in a constantly on state, keeping switching element 31p2 in a constantly off state, and alternately turning on switching elements 31p1 and 31n1, submodule 7 shown in FIG. 3(b) outputs a positive voltage or a zero voltage. In addition, by keeping switching element 31n2 in a constantly off state, keeping switching element 31p2 in a constantly on state, and alternately turning on switching elements 31p1 and 31n1, submodule 7 shown in FIG. 3(b) can also output a zero voltage or a negative voltage.

Bypass switch 34 is connected between input/output terminals P1 and P2. Bypass switch 34 is connected in parallel with the series bodies of switching elements 31n1 and 31n2. By turning on bypass switch 34, submodule 7 is short-circuited.

The case in which submodule 7 has a half bridge cell configuration shown in FIG. 3(a) and the semiconductor switching elements and the capacitor serving as an energy accumulation element are used will be described below as an example. However, submodule 7 may have a full bridge configuration shown in FIG. 3(b). Alternatively, a submodule other than the submodules having the above-described configurations, e.g., a submodule having a circuit configuration also called "1.5 half bridge configuration" in which one of switching elements 31 in FIG. 3(b) is replaced only by a diode may be used.

<Capacitor Voltage of Submodule>

An output DC voltage of power converter 2 implemented by an MMC converter is DC voltage Vdc between positive electrode DC terminal Np and negative electrode DC terminal Nn. DC voltage Vdc is determined by a product sum of an instantaneous capacitor voltage Vcj of j-th submodule 7j that forms each leg circuit 4 and a switching state Si. A switching state Sj is "1" when switching element 31p is on, and "0" when switching element 31p is off.

For ease of explanation, variations in capacitor voltages Vc of submodules 7 between the arms and in the arm are ignored. Here, Vav represents a time average voltage value of capacitor voltage Vc, Mdc represents a DC modulation rate, and n represents the number of submodules per arm (i.e., included in each arm). Then, the following equation (1) holds. In this case, the number of submodules included in each leg circuit 4 is 2n.

$$Vdc = \Sigma(Vcj \times Sj) = Vav \times 2n \times Mdc \tag{1}$$

According to the equation (1) above, when DC modulation rate Mdc is constant (typically, 0.5), the number n of submodules is proportional to Vdc/Vav, and thus, the number n of submodules can be reduced by increasing average voltage value Vav.

Time average voltage value Vav (hereinafter, also simply referred to as "average voltage value Vav") is obtained by dividing a total sum of instantaneous capacitor voltages Vcj of submodules 7j in the arm by the number n of submodules, and is expressed by the following equation (2). The symbol "< >" in the equation (2) represents a time average.

$$Vav = <(\Sigma Vcj)/n> \tag{2}$$

During the normal power conversion operation (i.e., normal operation), controller 3 controls each submodule 7 in the arm such that the time average voltage value of capacitor voltage Vc of each submodule 7 in the arm is set to value Vav expressed by the equation (2).

However, in power converter 2, a current having an AC component mainly composed of a fundamental frequency component flows into capacitor 32 mounted on each submodule 7. Therefore, a ripple voltage actually occurs in capacitor 32 and capacitor voltage Vc fluctuates around average voltage value Vav.

Figure 4:
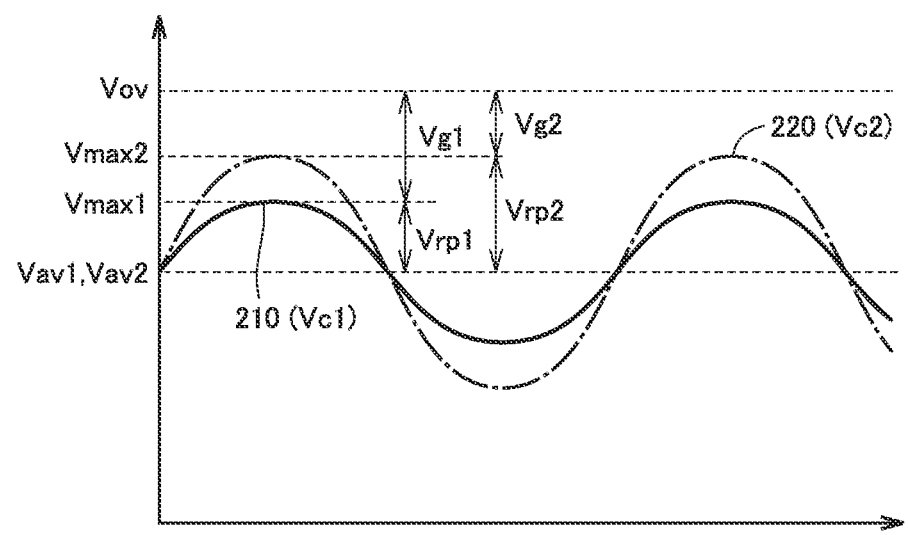
FIG. 4 is a diagram for illustrating voltage fluctuations of capacitors.

FIG. 4 is a diagram for illustrating voltage fluctuations of the capacitors. Referring to FIG. 4, a waveform 210 represents a temporal change in a capacitor voltage Vc1 of capacitor 32 (hereinafter, also referred to as "capacitor 32_1") mounted on submodule 7 in power converter 2_1. A waveform 220 represents a temporal change in a capacitor voltage Vc2 of capacitor 32 (hereinafter, also referred to as "capacitor 32_2") mounted on submodule 7 in power converter 2_2. Capacitors 32_1 and 32_2 are implemented by capacitors having an equal rating (e.g., having an equal capacitance, an equal withstand voltage and the like).

In the example in FIG. 4, the number n1 of submodules included in each arm of power converter 2_1 is equal to the number n2 of submodules included in each arm of power converter 2_2. In addition, power converter 2_1 and power converter 2_2 are connected to common DC circuit 14. Therefore, based on the equation (1), an average voltage value Vav1 of capacitor voltage Vc1 is equal to an average voltage value Vav2 of capacitor voltage Vc2.

Here, C represents a capacitance of the capacitor, F represents a fundamental frequency, and Icap represents a current flowing through the capacitor. Then, a ripple voltage Vrp that occurs in the capacitor has a relationship as expressed by the following equation (3):

$$Vrp \propto (1/C) \times (1/F) \times Icap \tag{3}$$

In the first embodiment, fundamental frequency F1 of AC system 12_1 is 60 Hz and fundamental frequency F2 of AC system 12_2 is 50 Hz. Therefore, a ripple voltage Vrp1 of capacitor 32_1 in power converter 2_1 connected to AC system 12_1 is smaller than a ripple voltage Vrp2 of capacitor 32_2 in power converter 2_2 connected to AC system 12_2. Ripple voltage Vrp1 refers to a difference between a maximum voltage value Vmax1 of capacitor voltage Vc1 and average voltage value Vav1. Ripple voltage Vrp2 refers to a difference between a maximum voltage value Vmax2 of capacitor voltage Vc2 and average voltage value Vav2. Capacitors 32_1 and 32_2 composed of the same component have an equal capacitance. Assuming that current Icap is the same, ripple voltage Vrp1 is 5/6 times as great as ripple voltage Vrp2.

In addition, since capacitors 32_1 and 32_2 are composed of the same component, capacitors 32_1 and 32_2 have an equal withstand voltage Vov. Therefore, a voltage margin Vg1 (=Vov−Vmax1) in capacitor 32_1 is greater than a voltage margin Vg2 (=Vov−Vmax2) in capacitor 32_2.

When the same capacitor is applied as capacitors 32_1 and 32_2, capacitance C is determined to satisfy the specifications based on greater ripple voltage Vrp2 (i.e., such that voltage margin Vg2 becomes equal to or greater than a reference margin). In this case, it is understood that voltage margin Vg1 of capacitor 32_1 is excessive, although voltage margin Vg1 of capacitor 32_1 satisfies the specifications. Specifically, capacitor 32_1 includes an extra voltage margin corresponding to a difference value Vdi (=Vrp2−Vrp1) between ripple voltage Vrp2 and ripple voltage Vrp1.

In the first embodiment, difference value Vdi is used to adjust the average voltage value of capacitor 32_1 and reduce the number of submodules included in power converter 2_1 connected to the AC system 12_1 side on the high frequency side. As a result, the size of the entire power conversion system is reduced.

Figure 5:
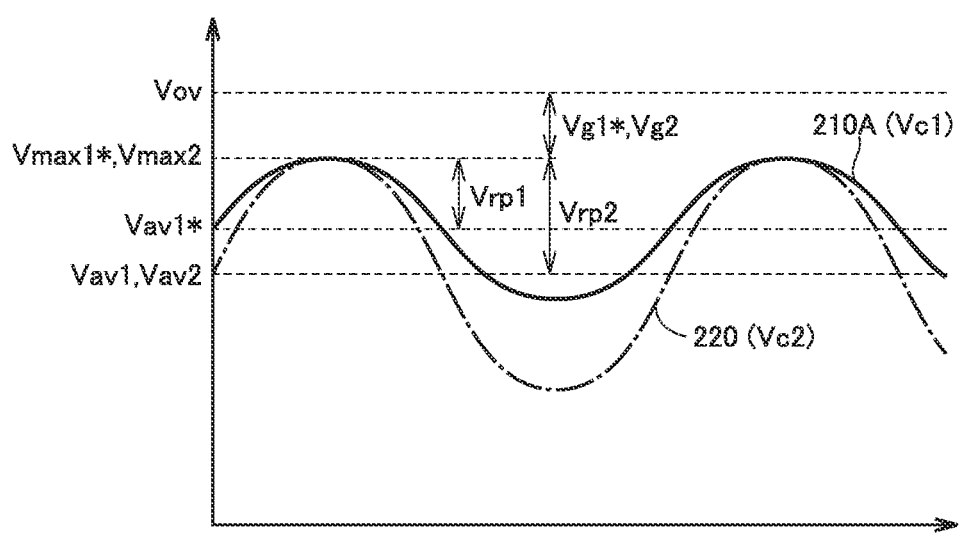
FIG. 5 shows changes in capacitor voltages according to the present embodiment.

FIG. 5 shows changes in capacitor voltages according to the first embodiment. Referring to FIG. 5, a waveform 210A represents a temporal change in capacitor voltage Vc1 of capacitor 32_1. Waveform 210A is formed by adding difference value Vdi to waveform 210 in FIG. 4, and thus, an average voltage value Vav1* of capacitor voltage Vc1 shown in FIG. 5 is larger by difference value Vdi than average voltage value Vav1 shown in FIG. 4. In contrast, average voltage value Vav2 of capacitor voltage Vc2 of capacitor 32_2 is equal to average voltage value Vav2 (=Vav1) in FIG. 4. Therefore, it is understood that average voltage value Vav1* is larger by difference value Vdi than average voltage value Vav2. In other words, average voltage value Vav1* is a value obtained by adding difference value Vdi to average voltage value Vav2.

As expressed by the equation (1) above, average voltage value Vav of the capacitor changes depending on the number n of submodules per arm. Here, X % represents a rate of change in average voltage value Vav1* with respect to average voltage value Vav1 of capacitor 32_1. Then, the following equation (4) holds:

$$X = ((Vav1* - Vav1)/Vav1) \times 100 \tag{4}$$

Since DC voltage Vdc in the equation (1) does not change, it is understood that the number n of submodules is reduced by X % when average voltage value Vav increases by X %. Therefore, in the example in FIG. 5, the number n1* of submodules included in each arm of power converter 2_1 is smaller by Y (=n1×X/100) than the number n1 of submodules in the example in FIG. 4.

In the present embodiment, the number of submodules per phase of power converter 2_1 included in power conversion device 10_1 is set at n1*. During the normal operation, controller 3_1 controls each submodule 7 in the arm such that the time average voltage value of capacitor voltage Vc of each submodule 7 included in the arm of power converter 2_1 is set to average voltage value Vav1*. On the other hand, the number of submodules per phase of power converter 2_2 included in power conversion device 10_2 is set at n2. During the normal operation, controller 3_2 controls each submodule 7 in the arm such that the time average voltage value of capacitor voltage Vc of each submodule 7 included in the arm of power converter 2_2 is set to average voltage value Vav2. As a result, capacitor voltages Vc1 and Vc2 of capacitors 32_1 and 32_2 change as shown in FIG. 5.

In the example in FIG. 5, a maximum voltage value Vmax1* of capacitor voltage Vc1 is equal to maximum voltage value Vmax2 of capacitor voltage Vc2, and thus, a voltage margin Vg1* of capacitor 32_1 is equal to voltage margin Vg2 of capacitor 32_2. Therefore, it is understood that voltage margin Vg1* of capacitor 32_1 does not include an extra voltage margin, although capacitor 32_1 ensures a voltage margin that satisfies the specifications.

As described above, in the first embodiment, submodules 7 in power converters 2_1 and 2_2 connected to AC systems 12_1 and 12_2 having different fundamental frequencies, respectively, are the same, and difference value Vdi between the ripple voltage of capacitor 32_1 and the ripple voltage of capacitor 32_2 caused thereby can be used to reduce the number of submodules in power converter 2_1. Therefore, it is possible to reduce the size of power converter 2_1 while ensuring maintainability of power converters 2_1 and 2_2, and as a result, the size of the entire power conversion system can be reduced.

<When Submodule Fails>

A method for adjusting average voltage value Vav when submodule 7 fails will be described.

Controller 3 receives, as state information of each submodule 7, a healthy state determination signal indicating a healthy state of submodule 7. When submodule 7 is in a healthy state, the healthy state determination signal is "1". When submodule 7 is in a failure state, the healthy state determination signal is "0". A failure of submodule 7 is not limited to an element failure, and means that submodule 7 no longer operates in accordance with a command from controller 3. Examples of the failure of submodule 7 include a failure of a switching element, a failure of a gate driver, a breakage of a capacitor, a breakage of a bus bar, a communication error and the like.

Controller 3 outputs a corresponding operation command to each arm (e.g., the U-phase upper arm, the U-phase lower arm, the V-phase upper arm, the V-phase lower arm, the W-phase upper arm, and the W-phase lower arm), thereby controlling each arm. Therefore, on the arm including submodule 7 that has failed, controller 3 performs various types of control for dealing with the failure.

Let us assume that the number of submodules in leg circuit 4u corresponding to the U phase is 2m (m is an integer equal to or greater than 2), the number of submodules in the U-phase upper arm is m, and the number of submodules in the U-phase lower arm is m. For example, when the healthy state determination signals received from k (k is an integer equal to or greater than 1 and k≤m) submodules 7_i, of m submodules 7 in the U-phase upper arm, are "0", controller 3 detects a failure of each submodule 7_i. By turning on bypass switch 34 of each submodule 7_i, controller 3 bypasses each submodule 7_i that has failed.

Next, based on the number (i.e., k) of submodules 7_i that have failed, controller 3 increases average voltage value Vav in each submodule 7 included in the U-phase upper arm. Specifically, controller 3 increases average voltage value Vav by a factor of m/(m−k). That is, (average voltage value Vav after failure)/(average voltage value Vav before failure) =m/(m−k). In this case, controller 3 controls (m−k) submodules 7 such that the time average voltage value of capacitor voltage Vc of each of (m−k) healthy submodules 7 in the U-phase upper arm is set to increased average voltage value Vav. As a result, a voltage output by k submodules 7 can be compensated for by remaining (m−k) healthy submodules 7 before failure.

<When Fault Occurs in AC System>

A method for adjusting average voltage value Vav when a fault occurs in AC system 12 will be described. Let us assume that a fault occurs in AC system 12_1. However, this fault is a temporary fault that will be removed after a certain period of time from the occurrence of the fault.

FIG. 6 shows a change in capacitor voltage before and after a fault occurs in the AC system. Referring to FIG. 6, a waveform 250 represents average voltage value Vav1* of capacitor 32_1. For the sake of convenience, average voltage value Vav1* before a fault occurs is denoted as "V0". Average voltage value V0 is equal to average voltage value Vav1* in FIG. 5. A waveform 260 represents capacitor voltage Vc1 including voltage fluctuations (i.e., ripple voltage Vrp1) of capacitor 32_1.

At time t1, a fault occurs in AC system 12_1 and controller 3_1 detects the fault. For example, controller 3_1 determines that the fault has occurred in AC system 12_1, when at least one of absolute values of arm currents Ipu, Ipv, Ipw, Inu, Inv, and Inw detected by arm current detectors 9A and 9B exceeds a threshold value Th1, or when a total value of the arm currents flowing through the respective phases exceeds a threshold value Th2. Alternatively, controller 3_1 may determine that the fault has occurred, when any one of the AC voltages detected by AC voltage detector 18 exceeds (or falls below) a threshold value Th3.

From time t0 to time t1, controller 3_1 controls each submodule 7 such that the time average voltage value of capacitor voltage Vc of each submodule 7 in the arm is set to average voltage value V0. However, when controller 3_1 detects the fault at time t1, controller 3_1 controls each submodule 7 such that the time average voltage value of capacitor voltage Vc of each submodule 7 in the arm is set to a value obtained by subtracting a reference value D1 from average voltage value V0 (i.e., V0−D1). Thus, controller 3_1 decreases average voltage value Vav1*.

When the fault is removed at time t2, a current flows from AC system 12_1 to power converter 2_1, and thus, capacitor voltage Vc1 increases abruptly. In the present embodiment, controller 3_1 intentionally decreases capacitor voltage Vc1 at the occurrence of the fault, which can prevent capacitor voltage Vc1 from exceeding withstand voltage Vov after the fault is removed.

When a fault occurs in AC system 12_2, controller 3_2 performs the operation similar to the above-described operation of controller 3_1. Specifically, when controller 3_2 detects the fault in AC system 12_2, controller 3_2 controls each submodule 7 such that the time average voltage value of capacitor voltage Vc of each submodule 7 in the arm is set to a value obtained by subtracting a reference value D2 from the average voltage value before the fault occurs. Reference value D2 may be equal to reference value D1. Thus, controller 3_2 decreases average voltage value Vav2.

Controller 3_2 may also decrease average voltage value Vav2 when a fault has occurred in AC system 12_1. In this case, controller 3_2 receives, from controller 3_1 (or another higher-level device), information indicating that the fault has occurred in AC system 12_1. After controller 3_2 receives the information, controller 3_2 decreases average voltage value Vav2. Thus, even when the fault in AC system 12_1 may affect capacitor voltage Vc2 of each submodule 7 in power converter 2_2, it is possible to prevent capacitor voltage Vc2 from exceeding withstand voltage Vov.

<When Dielectric Strength of DC Circuit Decreases>

A method for adjusting average voltage value Vav when a dielectric strength of DC circuit 14 decreases will be described. Let us assume that DC circuit 14 is a DC power transmission line, and the dielectric strength of DC circuit 14 decreases due to salt-containing snow and the like that adhere to the DC power transmission line.

Each of transformers 13_1 and 13_2 is implemented by a transformer having a variable transformation ratio. The transformer having a variable transformation ratio is implemented by, for example, a transformer having a tap switching function, and the like. In addition, controller 3 is configured to be capable of communicating with transformer 13, and transmits, to transformer 13, various commands such as a command to change the transformation ratio.

When a system operator determines that the dielectric strength of DC circuit 14 has decreased, the system operator inputs, to controllers 3_1 and 3_2, information indicating that the dielectric strength of DC circuit 14 has decreased. Then, DC voltage Vdc of DC circuit 14 is decreased by ΔVdc.

In this case, controller 3_1 decreases, by ΔVav1*, average voltage value Vav1* of capacitor 32_1 in each submodule 7 included in power converter 2_1. Similarly, controller 3_2 decreases, by ΔVav2, average voltage value Vav2 of capacitor 32_2 in each submodule 7 included in power converter 2_2. Since the number of submodules included in each arm of power converter 2_1 is n1*, ΔVav1*=ΔVdc/(Mdc×2n1*) based on the relationship expressed by the equation (1). Since the number of submodules included in leg circuit 4 of power converter 2_2 is n2, ΔVav2=ΔVdc/(Mdc×2n2) based on the relationship expressed by the equation (1).

It is necessary to maintain the voltages of AC systems 12_1 and 12_2, while decreasing DC voltage Vdc by ΔVdc. Here, V1_1 represents an AC voltage on the primary side (i.e., AC system 12_1 side) of transformer 13_1. In addition, V2_1 represents an AC voltage on the secondary side (i.e., power converter 2_1 side) of transformer 13_1 before DC voltage Vdc decreases, and V2_1* represents an AC voltage on the secondary side of transformer 13_1 after DC voltage Vdc decreases.

In this case, controller 3_1 adjusts a transformation ratio α1 of transformer 13_1 such that AC voltage V1_1 on the primary side of transformer 13_1 is maintained. Specifically, controller 3_1 instructs transformer 13_1 to change transformation ratio α1 from (V2_1)/(V1_1) to (V2_1*)/(V1_1).

Similarly, V1_2 represents an AC voltage on the primary side (i.e., AC system 12_2 side) of transformer 13_2, V2_2 represents an AC voltage on the secondary side (i.e., power converter 2_2 side) of transformer 13_2 before DC voltage Vdc decreases, and V2_2* represents an AC voltage on the secondary side of transformer 13_2 after DC voltage Vdc decreases. In this case, controller 3_2 adjusts a transformation ratio α2 of transformer 13_2 such that AC voltage V1_2 on the primary side of transformer 13_2 is maintained. Specifically, controller 3_2 instructs transformer 13_2 to change transformation ratio α2 from (V2_2)/(V1_2) to (V2_2*)/(V1_2).

As a result, when the dielectric strength of DC circuit 14 decreases, it is possible to prevent damage to DC circuit 14 by decreasing DC voltage Vdc, and to maintain the voltage on the AC system 12 side.

Second Embodiment

In the first embodiment, description has been given of the case in which the plurality of AC systems 12_1 and 12_2 have different fundamental frequencies. In a second embodiment, description will be given of the case in which power requests from the plurality of AC systems 12_1 and 12_2 are different from each other.

According to the above-described equation (3), the ripple voltage increases in proportion to current Icap flowing through the capacitor. Capacitors 32_1 and 32_2 composed of the same component have an equal capacitance. Therefore, when fundamental frequency F1 of AC system 12_1 is equal to fundamental frequency F2 of AC system 12_2, ripple voltage Vrp becomes greater as current Icap becomes greater. In the second embodiment, attention is focused on a difference in currents Icap flowing through the capacitors in power converters 2_1 and 2_2, which is caused by a difference in power requests from AC systems 12_1 and 12_1. Here, power converters 2_1 and 2_2 operate to meet the power requests from AC systems 12_1 and 12_2, respectively.

Arm current Iarm flowing in power converter 2 flows through each of the positive electrode side (i.e., the switching element 31$p$ side) and the negative electrode side (i.e., the switching element 31$n$ side) of submodule 7. In the following description, the semiconductor switching element of each of switching elements 31$p$ and 31$n$ is implemented by an IGBT.

A current Isp flowing through the positive electrode side is a summed current of a current flowing through the IGBT of switching element 31$p$ and a current flowing through the FWD of switching element 31$p$. This summed current corresponds to current Icap flowing through capacitor 32. On the other hand, a current Isn flowing through the negative electrode side is a summed current of a current flowing through the IGBT of switching element 31$n$ and a current flowing through the FWD of switching element 31$n$. In switching elements 31$p$ and 31$n$, the current flowing through the FWD is opposite in direction to the current flowing through the IGBT.

A current sharing ratio between current Isp (i.e., current Icap) and current Isn changes depending on a power factor (PF) of AC system 12. Arm current Iarm is a sum of current Isp and current Isn, and an effective value expression thereof is Iarm=(Isp$^2$+Isn$^2$)$^{1/2}$. In FIG. 3, a positive direction of current Isp corresponds to a direction from input/output terminal P1 to switching element 31$p$1, and a positive direction of current Isn corresponds to a direction from input/output terminal P1 to switching element 31$n$1.

FIG. 7 is a diagram for illustrating a relationship between current Isp flowing through the positive electrode side and current Isn flowing through the negative electrode side in the submodule. In FIG. 7, the vertical axis represents an effective value of current Isp (=Icap), and the horizontal axis represents an effective value of current Isn. A straight line 302 is a straight line that satisfies current Isp=current Isn. Straight lines 304, 306 and 308 are straight lines indicating the relationship between current Isp and current Isn when the power factor of AC system 12 is 0, 0.95 and 1.00, respectively. Current effective values {=(Isp$^2$+Isn$^2$)$^{1/2}$} of arm current Iarm at points 354, 356 and 358 on straight lines 304, 306 and 308, respectively, are the same. A curved line 362 represents points at which the current effective values of arm current Iarm are the same.

According to straight lines 304 to 308, as the power factor at the AC output of power converter 2 becomes greater, the current disproportionately flows through the negative electrode side, which makes current Isn greater and current Isp smaller. In contrast, as the power factor becomes smaller, current Isp (i.e., current Icap) becomes greater. When the power factor is constant, current Icap becomes greater as arm current Iarm becomes greater. The magnitude of arm current Iarm is proportional to the magnitude of an apparent power input and output between power converter 2 and AC system 12. Therefore, it is also said that when the power factor is constant, current Icap becomes greater as the input and output apparent power becomes greater. When the input apparent power input to power converter 2 is different from the output apparent power output from power converter 2, the magnitude of current Icap depends on the greater one of the input apparent power and the output apparent power.

Therefore, when the power requests (e.g., an input/output request of the apparent power and a requested power factor) from AC systems 12_1 and 12_2 are different, currents Icap flowing through capacitors 32 in power converters 2_1 and 2_2 are different in magnitude, and as a result, the ripple voltages of capacitors 32 are different in magnitude. By referring to FIG. 7, current Icap based on the power factor and the apparent power requested from AC system 12 can be obtained.

Let us assume that a power factor requested from AC system 12_1 is equal to a power factor requested from AC system 12_2. In this case, when input and output of an apparent power requested from AC system 12_1 is smaller than input and output of an apparent power requested from AC system 12_2, a current Icap1 flowing through capacitor 32_1 in power converter 2_1 is smaller than a current Icap2 flowing through capacitor 32_2 in power converter 2_2.

Therefore, ripple voltage Vrp1 of capacitor 32_1 is smaller than ripple voltage Vrp2 of capacitor 32_2. Therefore, as described in the first embodiment with reference to FIG. 5, the number of submodules in power converter 2_1 can be reduced by making the average voltage value of capacitor voltage Vc1 of capacitor 32_1 greater by difference value Vdi (=Vrp2−Vrp1) than the average voltage value of capacitor voltage Vc2 of capacitor 32_2.

Next, let us assume that the input and output of the apparent power requested from AC system 12_1 is equal to the input and output of the apparent power requested from AC system 12_2. In this case, when the power factor requested from AC system 12_1 is greater than the power factor requested from AC system 12_2, current Icap1 flowing through capacitor 32_1 in power converter 2_1 is smaller than current Icap2 flowing through capacitor 32_2 in power converter 2_2. Therefore, ripple voltage Vrp1 of capacitor 32_1 is smaller than ripple voltage Vrp2 of capacitor 32_2.

Therefore, the number of submodules in power converter 2_1 can be reduced by making the average voltage value of capacitor voltage Vc1 of capacitor 32_1 greater by difference value Vdi than the average voltage value of capacitor voltage Vc2 of capacitor 32_2.

In the above-described example, description has been given of the case in which the power factor requested from AC system 12_1 is equal to the power factor requested from AC system 12_2 and the case in which the input and output of the apparent power requested from AC system 12_1 is equal to the input and output of the apparent power requested from AC system 12_2. However, the power factor and the input and output of the apparent power requested from AC system 12_1 may be different from the power factor and the input and output of the apparent power requested from AC system 12_2. For example, in FIG. 7, a point 371 corresponds to the current values (Isn1 and Icap1) based on the power factor and the input and output of the apparent power requested from AC system 12_1, and a point 372 corresponds to the current values (Isn2 and Icap2) based on the power factor and the apparent power requested from AC system 12_2. Based on the positional relationship between point 371 and point 372, the power factor requested from AC system 12_1 is smaller than the power factor requested from AC system 12_2, and the input and output of the apparent power requested from AC system 12_1 is smaller than the input and output of the apparent power requested from AC system 12_2.

Referring to FIG. 7, current Icap1 at point 371 is smaller than current Icap2 at point 372. Therefore, ripple voltage Vrp1 of capacitor 32_1 is smaller than ripple voltage Vrp2 of capacitor 32_2. Therefore, the number of submodules in power converter 2_1 can be reduced by making the average voltage value of capacitor voltage Vc1 of capacitor 32_1 greater by difference value Vdi than the average voltage value of capacitor voltage Vc2 of capacitor 32_2.

As described above, the effective value of the current (i.e., current Icap1) of capacitor 32_1 in power converter 2_1 based on the power factor and the apparent power requested from AC system 12_1 is compared with the effective value of the current (i.e., current Icap2) of capacitor 32_2 in power converter 2_2 based on the power factor and the apparent power requested from AC system 12_2. When current Icap1 is smaller than current Icap2, for example, ripple voltage Vrp1 is smaller than ripple voltage Vrp2, and thus, the number of submodules in power converter 2_1 can be reduced.

In the above-described example, submodules 7 in power converters 2_1 and 2_2 connected to AC systems 12_1 and 12_2 that are different in power requests, respectively, are the same, and difference value Vdi between the ripple voltage of capacitor 32_1 and the ripple voltage of capacitor 32_2 caused thereby can be used to reduce the number of submodules in power converter 2_1. Therefore, in the second embodiment as well, it is possible to reduce the size of one power converter while ensuring maintainability of power converters 2_1 and 2_2, and as a result, the size of the entire power conversion system can be reduced.

Other Embodiments

In the first embodiment, the method for adjusting average voltage value Vav in each of <When Submodule Fails>, <When Fault Occurs in AC System> and <When Dielectric Strength of DC Circuit Decreases> has been described. However, in the second embodiment as well, the method for adjusting average voltage value Vav in each case can be used.

The configurations illustrated as the embodiments above are merely examples of the configuration of the present disclosure, and can be combined with another known technique or can be modified by being omitted partially, for example, without going beyond the scope of the present disclosure. Moreover, the embodiments described above may be implemented, employing the processes and configurations described in other embodiments as appropriate.

It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

REFERENCE SIGNS LIST 2 power converter; 3 controller; 4u, 4v, 4w leg circuit; 5 upper arm; 6 lower arm; 7 submodule; 8A, 8B reactor; 9A, 9B detector; 10 power conversion device; 11A, 11B DC voltage detector; 12 AC system; 13 transformer; 14 DC circuit; 16 AC current detector; 18 AC voltage detector; 31n, 31n1, 31n2, 31p, 31p1, 31p2 switching element; 32 capacitor; 33 voltage detector; 34 bypass switch; 100 power conversion system.

The invention claimed is:

1. A power conversion system comprising:
a first power converter to perform power conversion between a first AC system and a DC circuit; and
a second power converter to perform power conversion between a second AC system and the DC circuit, wherein
each of the first power converter and the second power converter includes a plurality of submodules connected in series,
each of the plurality of submodules includes a plurality of switching elements and a capacitor,
a first fundamental frequency of the first AC system is greater than a second fundamental frequency of the second AC system, and
a first average voltage value of a capacitor in a first submodule included in the first power converter is larger than a second average voltage value of a capacitor in a second submodule included in the second power converter,
wherein the first average voltage value is a value obtained by adding, to the second average voltage value, a difference value between a ripple voltage of the capacitor in the second submodule and a ripple voltage of the capacitor in the first submodule.

2. The power conversion system according to claim 1, further comprising
a first controller to control each of a plurality of the first submodules in the first power converter, wherein
when one or more of the first submodules included in an arm of the first power converter fail, the first controller increases the first average voltage value in each of the first submodules included in the arm, based on the number of the one or more first submodules that have failed.

3. The power conversion system according to claim 2, wherein
the first controller increases, by a factor of m/(m−k), the first average voltage value in each of the first submodules included in the arm, where m (m is an integer equal to or greater than 2) represents the number of the first submodules included in the arm, and k (k is an integer equal to or greater than 1 and k<m) represents the number of the one or more first submodules that have failed.

4. The power conversion system according to claim 2, wherein
when a fault occurs in the first AC system, the first controller decreases the first average voltage value of the capacitor in each of the first submodules included in the first power converter.

5. The power conversion system according to claim 4, further comprising
a second controller to control each of a plurality of the second submodules in the second power converter, wherein
when the fault occurs in the first AC system, the second controller decreases the second average voltage value of the capacitor in each of the second submodules included in the second power converter.

6. The power conversion system according to claim 5, further comprising
a first transformer provided between the first AC system and the first power converter, and a second transformer provided between the second AC system and the second power converter, wherein
when a dielectric strength of the DC circuit decreases,
the first controller decreases, by a first value, the first average voltage value of the capacitor in each of the first submodules included in the first power converter, and adjusts a transformation ratio of the first transformer such that a voltage on the first AC system side of the first transformer is maintained, and
the second controller decreases, by a second value, the second average voltage value of the capacitor in each of the second submodules included in the second power converter, and adjusts a transformation ratio of the second transformer such that a voltage output from the second transformer to the second AC system is maintained.

7. A power conversion system comprising:
a first power converter to perform power conversion between a first AC system and a DC circuit; and
a second power converter to perform power conversion between a second AC system and the DC circuit, wherein
each of the first power converter and the second power converter includes a plurality of submodules connected in series,
each of the plurality of submodules includes a plurality of switching elements and a capacitor,
a current effective value of a capacitor in a first submodule included in the first power converter based on a power factor and an apparent power requested from the first AC system is smaller than a current effective value of a capacitor in a second submodule included in the second power converter based on a power factor and an apparent power requested from the second AC system, and
a first average voltage value of the capacitor in the first submodule is larger than a second average voltage value of the capacitor in the second submodule,
wherein the first average voltage value is a value obtained by adding, to the second average voltage value, a difference value between a ripple voltage of the capacitor in the second submodule and a ripple voltage of the capacitor in the first submodule.

8. The power conversion system according to claim 7, wherein
the power factor requested from the first AC system is equal to the power factor requested from the second AC system, and input and output of the apparent power requested from the first AC system are smaller than input and output of the apparent power requested from the second AC system.

9. The power conversion system according to claim 7, wherein
input and output of the apparent power requested from the first AC system are equal to input and output of the apparent power requested from the second AC system, and the power factor requested from the first AC system is greater than the power factor requested from the second AC system.

10. The power conversion system according to claim 3, wherein
when a fault occurs in the first AC system, the first controller decreases the first average voltage value of the capacitor in each of the first submodules included in the first power converter.

* * * * *